Aug. 29, 1939.　　　　H. G. EAKIN　　　　2,171,289
VEHICLE BRAKE
Filed July 28, 1937

INVENTOR
HOWARD G. EAKIN
BY
ATTORNEYS

Patented Aug. 29, 1939

2,171,289

UNITED STATES PATENT OFFICE 2,171,289

VEHICLE BRAKE

Howard G. Eakin, Milwaukee, Wis.

Application July 28, 1937, Serial No. 156,182

1 Claim. (Cl. 188—78)

This invention appertains to vehicle brakes, and more particularly to a novel arrangement and formation of shoes for engaging the brake drum.

With the use of low pressure tires the size of motor vehicle wheels has decreased. This has necessitated a decrease in the size of the brake drums and shoes, and consequently in spite of the increased vehicle speed, the active braking area of the drums and shoes has materially diminished. In all brakes with which I am familiar, opposed brake shoes are utilized, and these shoes are pivoted at one end and are spread at the opposite end. The shoes, of necessity, are relatively small, and consequently only engage a comparatively small portion of the inner circumference of the brake drum, and these shoes have to be moved a considerable distance into and out of their braking position. This gives a chance for loose play and frequent adjustment of the shoes is necessary.

One of the primary objects of my invention is to provide a vehicle brake having brake shoes of such a character and arrangement that the active braking area thereof corresponds substantially to the entire braking area of the drum, whereby a maximum amount of braking surface will be provided for bringing about a quick stopping of a vehicle.

Another salient object of my invention is to provide means whereby the brake shoes move substantially radially into and out of braking position, which permits a close positioning of the shoes relative to the drum, whereby a slight movement of the shoes only will be required for bringing about the braking of the vehicle, the said slight movement eliminating all lost motion and frequent adjustment and the like.

A further important object of my invention is to provide radially movable brake shoes with toggle links connecting the adjacent ends of the shoes together and to operating levers carried by a rotatable actuating disc, the toggle links functioning to spread the shoes apart and into engagement with the brake drum with equal pressure at all points.

A further important object of my invention is to provide means for preventing circumferential and lateral shifting of the shoes, whereby the shoes will always be in correct position for proper movement into and out of engagement with the brake drum.

A still further object of my invention is to provide a vehicle brake of the above character, which will be durable and efficient in use, one that will be simple and easy to manufacture, and one which can be placed upon the market and incorporated with a vehicle wheel at a small cost.

With these and other objects in view, the invention consists in the novel construction, arrangement, and formation of parts, as will be hereinafter more specifically described, claimed, and illustrated in the accompanying drawing, in which drawing:

Figure 1:
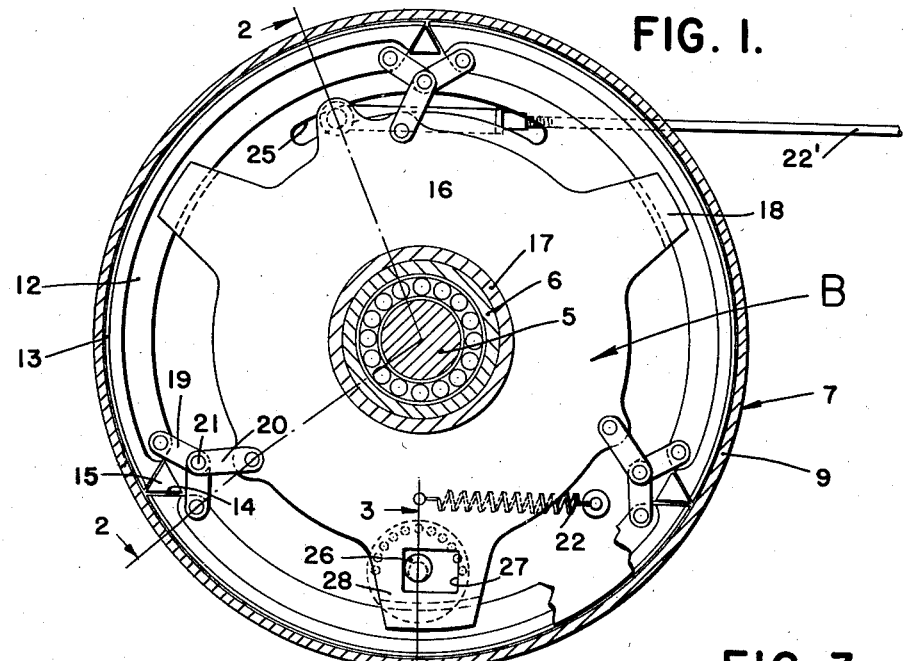
Figure 1 is a vertical sectional view through the brake, taken substantially on the line 1—1 of Figure 2, looking in the direction of the arrows.
Figure 2:
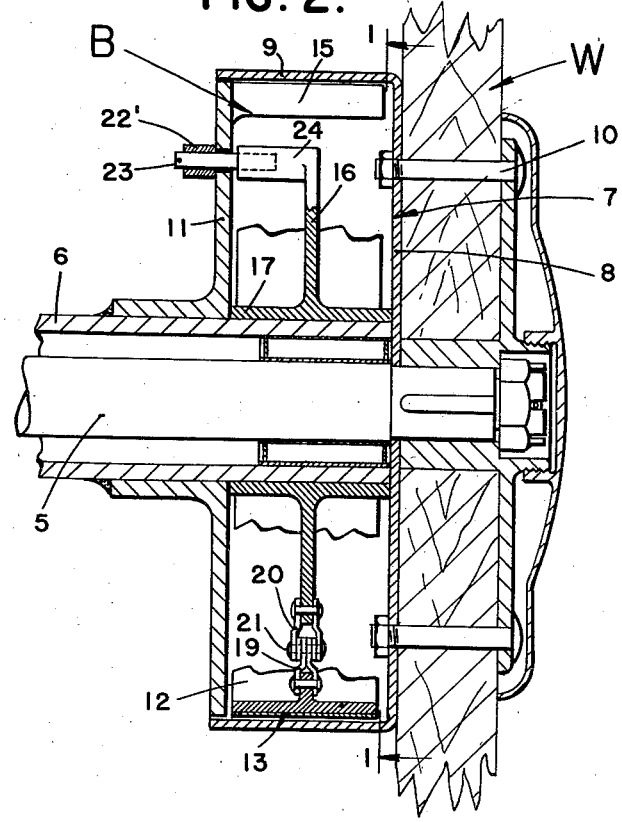
Figure 2 is a transverse sectional view through the brake, taken substantially on the line 2—2 of Figure 1, looking in the direction of the arrows.
Figure 3:
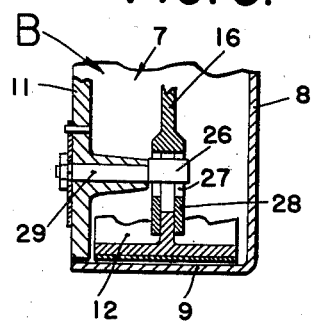
Figure 3 is a detail, fragmentary sectional view, taken on the line 3—3 of Figure 1, looking in the direction of the arrows.

Referring to the drawing in detail, wherein similar reference characters designate corresponding parts throughout the several views, the letter B generally indicates my improved brake for a vehicle wheel W. The wheel W can be of any style or character and forms no part of the present invention, and has merely been shown to illustrate the use of the invention. In the present instance, the wheel W is keyed to a drive axle 5, which is rotatably mounted in an axle housing 6.

My improved brake B comprises a brake drum 7, which can also be of a standard or any preferred construction. The drum includes a disc-shaped attaching wall 8 and an outer circular wall 9. Bolts 10 extend through the wheel and drum for rigidly securing the drum to the wheel. Rigidly secured to the axle housing 6 is a supporting plate 11, and this plate forms a closure for the inner side of the brake drum.

Mounted within the brake drum is a plurality of brake shoes 12. These shoes 12 are of a substantially T-shape in cross-section, and their outer surfaces have secured thereto suitable brake facings or linings 13. The brake shoes are movable radially toward and away from the inner surface of the brake drum, and the shoes form a circle, the circumference of which is substantially equal to the inner circumference of the brake drum. The inner adjacent edges of the brake shoes are beveled, as at 14, and disposed between these beveled edges are wedge-shaped positioning blocks 15, which can be formed on the supporting plate 11. The blocks 15 prevent rotation of the brake shoes.

Rotatably mounted within the drum and on the axle housing is an actuating or operating disc 16. This disc 16 is formed on or secured to a hub 17, and the hub is confined between the brake drum and the plate 11, whereby lateral shifting of the hub and the disc will be prevented. The outer edge of the disc can have formed thereon radially extending slotted guide arms 18, which receive the flanges of the brake shoes. This arrangement prevents lateral shifting of the shoes.

The shoes are moved in and out by a novel system of toggle levers, and thus the adjacent ends of the shoes have pivotally connected thereto toggle links 19, and the inner ends of these links are pivotally connected together and to operating levers 20 by means of pivot pins 21.

Referring to Figure 1 of the drawing, when the disc 16 is rotated in a clockwise direction, the toggle links 19 will be forced outwardly, which will squeeze the brake shoes apart and radially outward into braking contact with the brake drum. When the disc is rotated in a counter-clockwise direction, the toggle links will be swung inwardly and the shoes will be carried away from the brake drum.

I preferably use a contractile coil spring 22 to normally urge the disc in a counter-clockwise direction so as to hold the brake shoes out of braking engagement with the drum. Any means, either hydraulic or mechanical, can be used for rotating the disc in a clockwise direction, and, as illustrated, I have shown a brake rod 22′ connected by means of a pin 23 with an arm 24 formed on the disc 16. The pin 23 extends through a slot 25 formed in the supporting plate 11.

By my arrangement, I can employ brake shoes which will have an active braking area substantially equal to the braking area of the inner circumference of the drum, and consequently a vehicle can be brought to a quick stop. As pressure is equally applied to all of the shoes, an even braking will be had around the entire circumference of the brake drum. Only a slight movement is necessary to bring the shoes into and out of braking engagement with the drum, and thus the shoes can be normally positioned extremely close to the brake drum. This eliminates all lost motion and frequent adjustment of the shoes.

However, when adjustment is necessary, the same can be had by the use of a cam 26. This cam 26 is received within an opening 27 formed in an arm 28 carried by the disc 16. By rotating the cam, the disc can be turned so as to move the shoes in or out. The cam can be rotated in any desired manner, and in the present instance the same is formed on a rotatable shaft 29 carried by the supporting plate 11. The outer end of the shaft can be of a polygonal shape in cross-section for receiving a wrench head, and any preferred means can be used for holding the shaft against accidental rotation.

From the foregoing description, it can be seen that I have provided an exceptionally simple and durable brake for vehicle wheels.

Changes in details may be made without departing from the spirit or the scope of my invention, but what I claim as new is:

In a vehicle brake, a brake drum, a back-plate, arcuate brake shoes arranged within the drum and radially movable toward and away from the inner surface thereof, having inwardly extending flanges, said shoes forming a circle having a circumference substantially equal to the inner circumference of the drum, an operating disc rotatably mounted in the drum confined between the back-plate and the drum, interengaging means between the disc and the shoes for preventing lateral shifting of the shoes relative to one another and to the disc including the inwardly directed flanges on the shoes and slotted guide arms on the disc receiving the flanges, spring means normally tending to rotate the disc in one direction, and toggle links operatively connecting the adjacent ends of the shoes together and to the disc, the links being pivotally connected to the extreme outer ends of the shoes.

HOWARD G. EAKIN.